United States Patent
Yokoya

(10) Patent No.: US 6,800,005 B2
(45) Date of Patent: Oct. 5, 2004

(54) EXHAUST SYSTEM FOR A SMALL WATERCRAFT

(75) Inventor: Noboru Yokoya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/602,656

(22) Filed: Jun. 25, 2003

(65) Prior Publication Data

US 2004/0048527 A1 Mar. 11, 2004

(30) Foreign Application Priority Data

Jul. 2, 2002 (JP) ........................................ 2002-193360

(51) Int. Cl.⁷ ............................................. B63H 21/32
(52) U.S. Cl. ..................................... 440/89 R; 138/40
(58) Field of Search ............................ 440/89 R, 89 B, 440/89 E, 89 F, 89 G, 89 J

(56) References Cited

U.S. PATENT DOCUMENTS 3,130,541 A * 4/1964 Babbit .......................... 138/40
5,699,749 A * 12/1997 Yamada et al. .......... 114/55.51

* cited by examiner

Primary Examiner—Jesus D. Sotelo
(74) Attorney, Agent, or Firm—Birch, Stewart, Kolasch & Birch, LLP

(57) ABSTRACT

An exhaust system for a small watercraft wherein exhaust gas can flow smoothly includes a water muffler in the exhaust system for an engine incorporated in a small watercraft. An exhaust pipe is connected to the water muffler extending upwardly once and then extending downwardly in such a manner as to have a substantially U-shape. Spiral baffle plates are provided for spirally introducing exhaust gas on an inner face of the U-shaped exhaust pipe. Since the baffle plates are provided on the exhaust pipe, cooling water and exhaust gas can be separated from each other.

19 Claims, 8 Drawing Sheets

EXHAUST SYSTEM FOR A SMALL WATERCRAFT

CROSS-REFERENCE TO RELATED APPLICATIONS

The present nonprovisional application claims priority under 35 USC 119 to Japanese Patent Application No. 2002-193360 filed on Jul. 2, 2002 the entire contents thereof is hereby incorporated by reference.

BACKGROUND OF THE INVENTION

1. Field of the Invention

This invention relates to an exhaust system for a small watercraft that is propeled with jet water jetted from a jet pump.

2. Description of Background Art

A personal watercraft is a watercraft wherein a jet pump is attached to a rear portion of a watercraft body and is driven by an engine to take in water from the bottom of the watercraft and jet the taken-in water rearwardly to propel the watercraft.

A personal watercraft is known as set forth in Japanese Patent Laid-Open No. Hei 10-212936 entitled "Exhaust System for a Personal Watercraft." Essential part of FIG. 1 of the Official Gazette for his patent is incorporated herein as FIG. 8 and a description is given below of the exhaust system for this personal watercraft.

FIG. 8 is a side elevational view showing the conventional small watercraft. The small watercraft 100 includes an engine 102 provided at a substantially central location of a watercraft body 101. A water muffler 104 is connected to the engine 102 by an exhaust pipe 103, and a substantially inverted U-shaped exhaust pipe 105 is provided for the water muffler 104.

The substantially inverted U-shaped exhaust pipe 105 is connected at one end thereof to the water muffler 104, and extends, at a substantially half portion 106 thereof adjacent the substantially inverted U-shaped exhaust pipe 105, upwardly once and then extends, at the remaining substantially half portion 107 thereof, downwardly such that it generally has a substantially U-shape.

With the substantially inverted U-shaped exhaust system, exhaust gas and cooling water having arrived at the inside of the water muffler 104 from the engine 102 side can be discharged to the outside through the U-shaped exhaust pipe 105.

However, since the cooling water and the exhaust gas in the water muffler 104 flow in a mixed state into the exhaust pipe 105, the cooling water flows through an overall sectional area in the inside of the exhaust pipe 105.

Where the cooling water flows through an overall sectional area in the inside of the exhaust pipe 105 in this manner, it is estimated that the cooling water may fill up the inside of the exhaust pipe 105 to disturb a flow of the exhaust gas.

SUMMARY AND OBJECTS OF THE INVENTION

Therefore, it is an object of the present invention to provide an exhaust system for a small watercraft wherein exhaust gas can flow smoothly.

In order to solve the subject described above, according to the present invention, an exhaust system for an engine incorporated in the small watercraft includes a water muffler wherein an exhaust pipe connected to the water muffler extends upwardly once and then extends downwardly in such a manner as to have a substantially U-shape and exhaust gas and cooling water in the water muffler are discharged to the outside through the U-shaped exhaust pipe. A spiral baffle plates is provided for spirally introducing the exhaust gas. The spiral baffle plates are provided on an inner face of the U-shaped exhaust pipe.

Since the spiral baffle plates are provided on the inner face of the exhaust pipe, a flow of exhaust gas can be converted into a spiral flow by the baffle plates. Consequently, centrifugal force acts upon cooling water having entering into the exhaust pipe together with the exhaust gas so that the cooling water can be drawn up to the inner face of the exhaust pipe.

Consequently, since the cooling water can flow along the inner face of the exhaust pipe while the exhaust gas flows along a central portion of the exhaust pipe, the cooling water and the exhaust gas can be separated from each other.

According to the present invention, the exhaust system for a small watercraft includes an on/off valve capable of opening and closing an outlet of the exhaust pipe that is provided at the outlet of the exhaust pipe.

The on/off valve is provided on the outlet side of the exhaust pipe such that the outlet of the exhaust pipe can be opened or closed with the on/off valve. Since the on/off valve is provided, admission of water into the exhaust pipe from the outlet side can be prevented.

Incidentally, where the on/off valve is provided on the outlet side of the exhaust pipe, it is considered that a support member that supports the on/off valve may cross the outlet of the exhaust pipe. In this instance, there is a possibility that, if cooling water and exhaust gas flow in a mixed state with each other in the exhaust pipe, then the cooling water may strike against the support member and may reside in the proximity of the outlet of the exhaust pipe. Therefore, it maybe considered that the residing cooling water may have a bad influence on the flow of the exhaust gas to disturb the flow of the exhaust gas.

Therefore, in the present invention, the exhaust system, is configured such that the cooling water flows along the inner face of the exhaust pipe while the exhaust gas flows along a central portion of the exhaust pipe to separate the cooling water and the exhaust gas each other. When the cooling water and the exhaust gas are separated from each other in this manner, the cooling water striking against the support member can be prevented from disturbing the flow of the exhaust gas.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
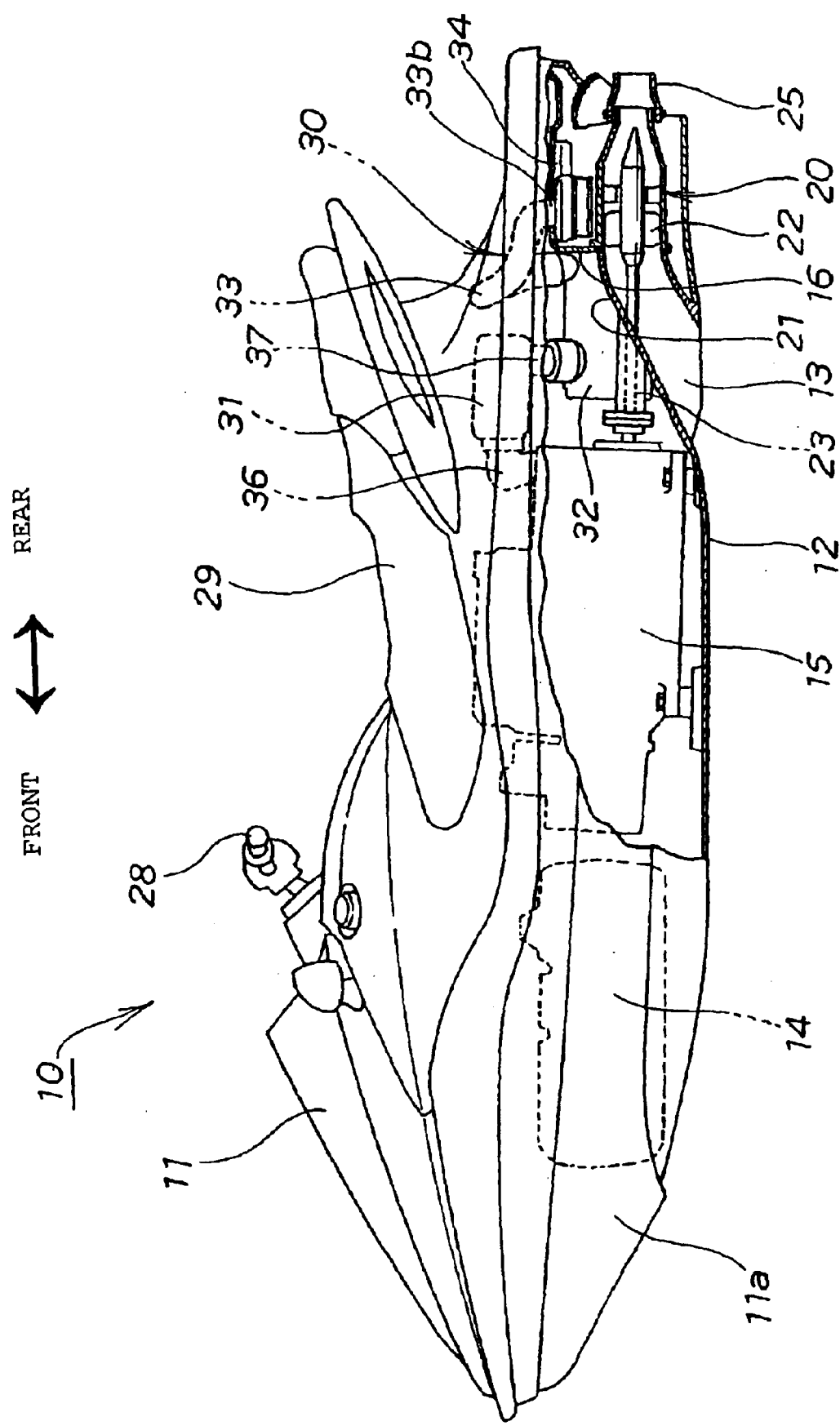
FIG. 1 is a side elevational view of a small watercraft that includes an exhaust system according to the present invention.

An embodiment of the present invention is described below with reference to the accompanying drawings. It is to be noted that the drawings should be viewed in the direction of reference characters.

FIG. 1 is a side elevational view of a small watercraft that includes an exhaust system according to the present invention.

The small watercraft 10 includes a fuel tank 14 attached to a front portion 11a of a watercraft body 11, an engine 15 is provided rearwardly of the fuel tank 14. A pump room 16 is provided rearwardly of the engine 15 with a jet pump 20 being provided in the pump room 16. An exhaust system 30 is provided for a small watercraft attached at the intake side thereof to the engine 15 and attached at the exhaust side thereof to the pump room 16. A steering handle bar 28 is attached above the fuel tank 14 and a seat 29 is attached rearwardly of the steering handle bar 28.

The jet pump 20 has a housing 21 extending rearwardly from an opening 13 of a watercraft bottom 12, and an impeller 22 is mounted for rotation in the housing 21 and connected to a drive shaft 23 of the engine 15.

With the jet pump 20, if the engine 15 is driven to rotate the impeller 22, then water sucked in through the opening 13 of the watercraft bottom 12 can be jetted rearwardly of the watercraft body 11 from a steering nozzle 25 through a rear end opening of the housing 21 to propel the small watercraft 10.

The steering nozzle 25 is a member mounted for swinging movement in leftward and rightward directions at a rear end of the housing 21. The steering direction of the watercraft body 11 can be controlled by swinging the steering nozzle 25 in the leftward or rightward direction through an operation of the steering handle bar 28.

Figure 2:
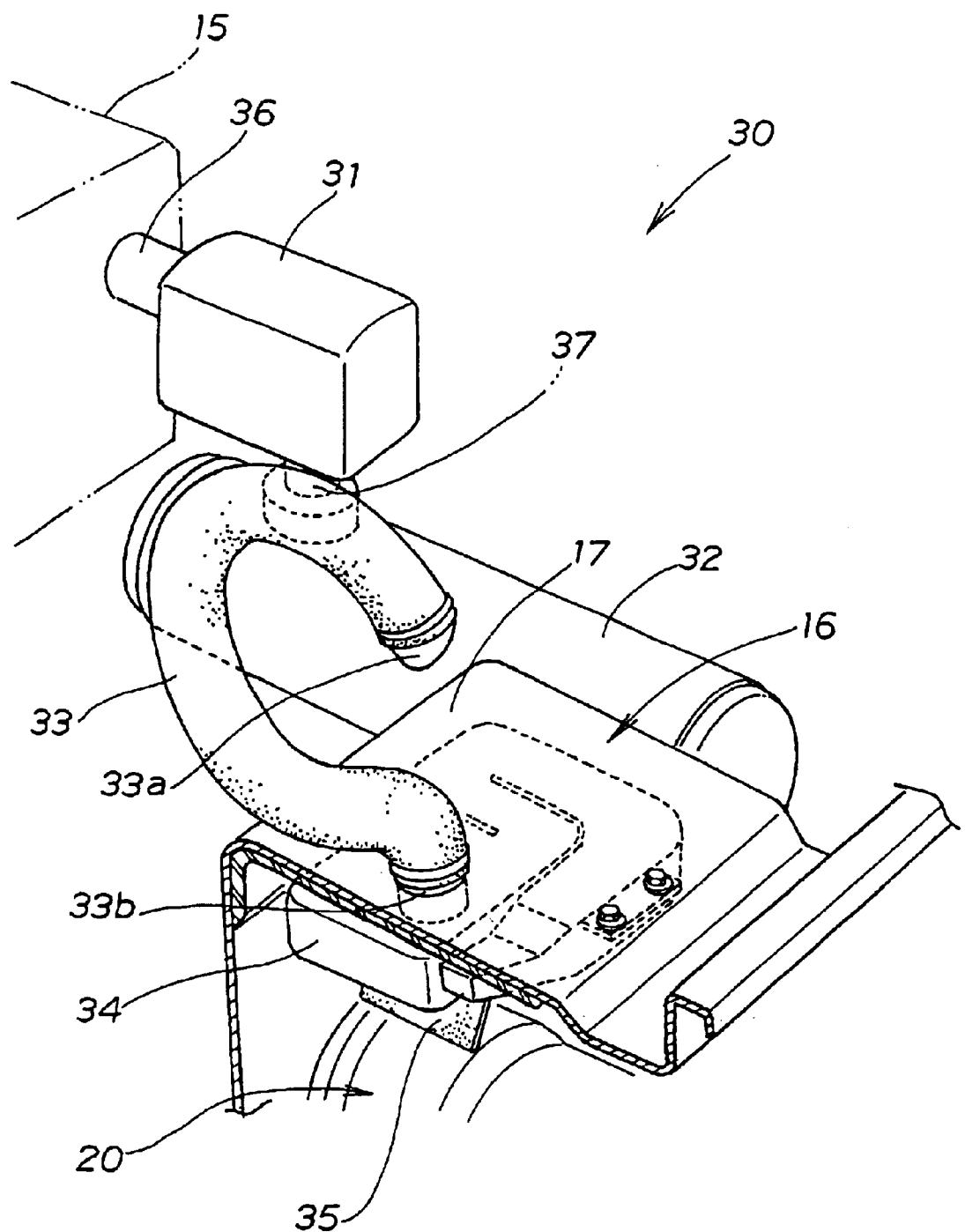
FIG. 2 is a perspective view of the exhaust system for a small watercraft according to the present invention.

FIG. 2 is a perspective view of the exhaust system for a small watercraft according to the present invention.

The exhaust system 30 is configured such that a water muffler 32 is connected to the engine 15 through an exhaust box 31 and an exhaust pipe 33 is connected to the water muffler 32. A resonator 34 is connected to the exhaust pipe 33 and an on/off valve 35 is provided for the resonator 34.

More particularly, the exhaust box 31 is connected through an exhaust pipe 36 to the engine 15 incorporated in the small watercraft 10, and the exhaust box 31 is connected to the water muffler 32 through a connecting pipe 37.

The exhaust pipe 33 is connected at an inlet side end 33a thereof to the water muffler 32 and has a substantially U-shape such that it extends upwardly once and then extends downwardly, and an outlet side end 33b of the exhaust pipe 33 extends through a ceiling wall 17 of the pump room 16.

Figure 3:
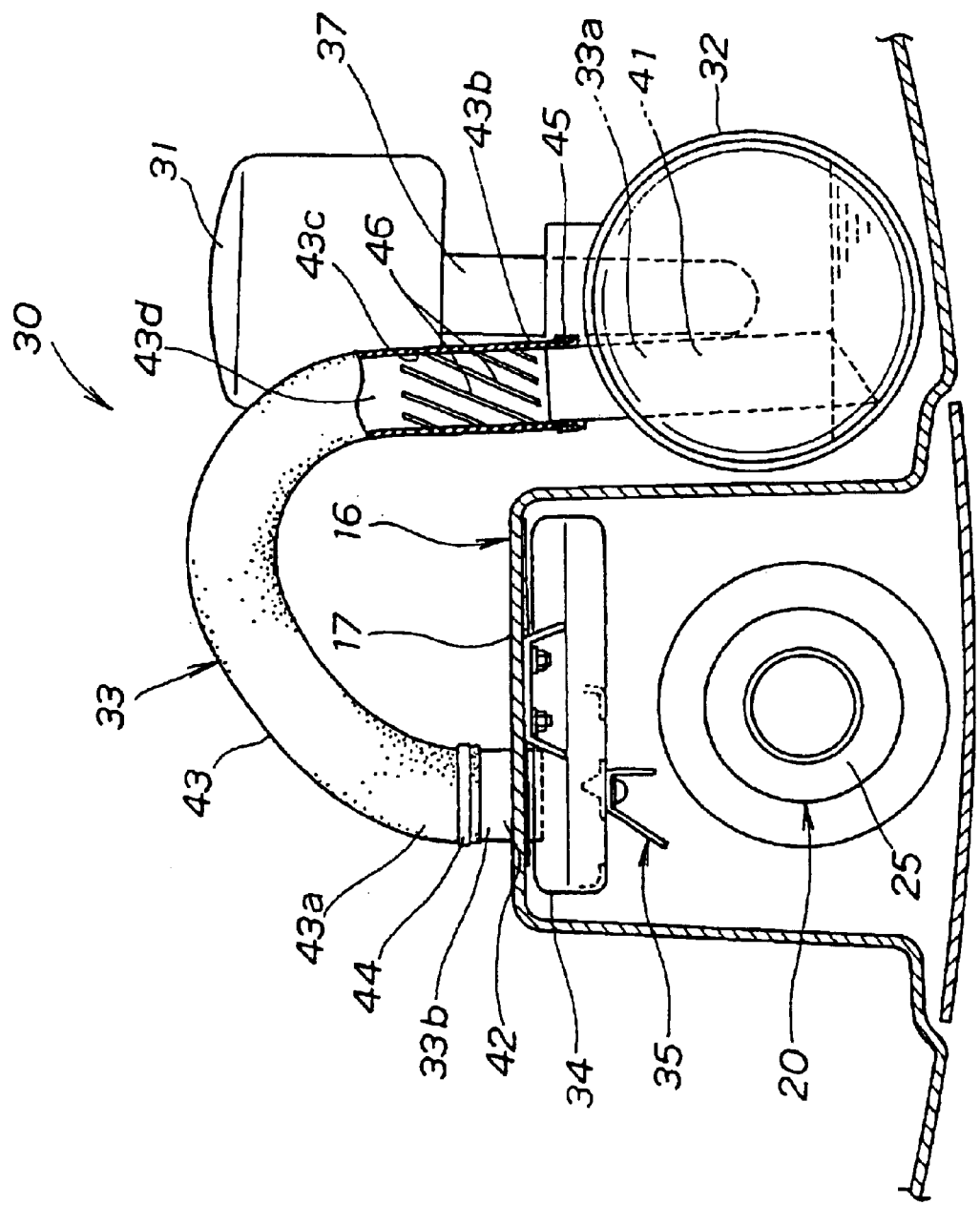
FIG. 3 is a schematic view of an essential part of the exhaust system for a small watercraft according to the present invention.

FIG. 3 is a schematic view of an essential part of the exhaust system for a small watercraft according to the present invention.

The exhaust pipe 33 includes an inlet side pipe 41 which forms the inlet side end 33a, an outlet side pipe 42 which forms the outlet side end 33b. A substantially inverted U-shaped hose 43 extends through the outlet side pipe 42 and the inlet side pipe 41.

In particular, the exhaust pipe 33 is configured such that the inlet side pipe 41 is inserted in the water muffler 32 and the outlet side pipe 42 extends through the ceiling wall 17 of the pump room 16. A rear end 43a of the hose 43 is in communication with the outlet side pipe 42 and a front end 43b is in communication with the inlet side pipe 41 such that the exhaust pipe 33 is formed in a substantially inverted U-shape while the rear end 43a is attached to the outlet side pipe 42 with a rear end band 44 and the front end 43b is attached to the inlet side pipe 41 with a front end band 45.

In the U-shaped exhaust pipe 33, a plurality of spiral baffle plates 46 . . . for spirally introducing exhaust gas are provided on an inner face 43c of the front end 43b of the hose 43, that is, on the inner face of the U-shaped exhaust pipe.

Figure 4:
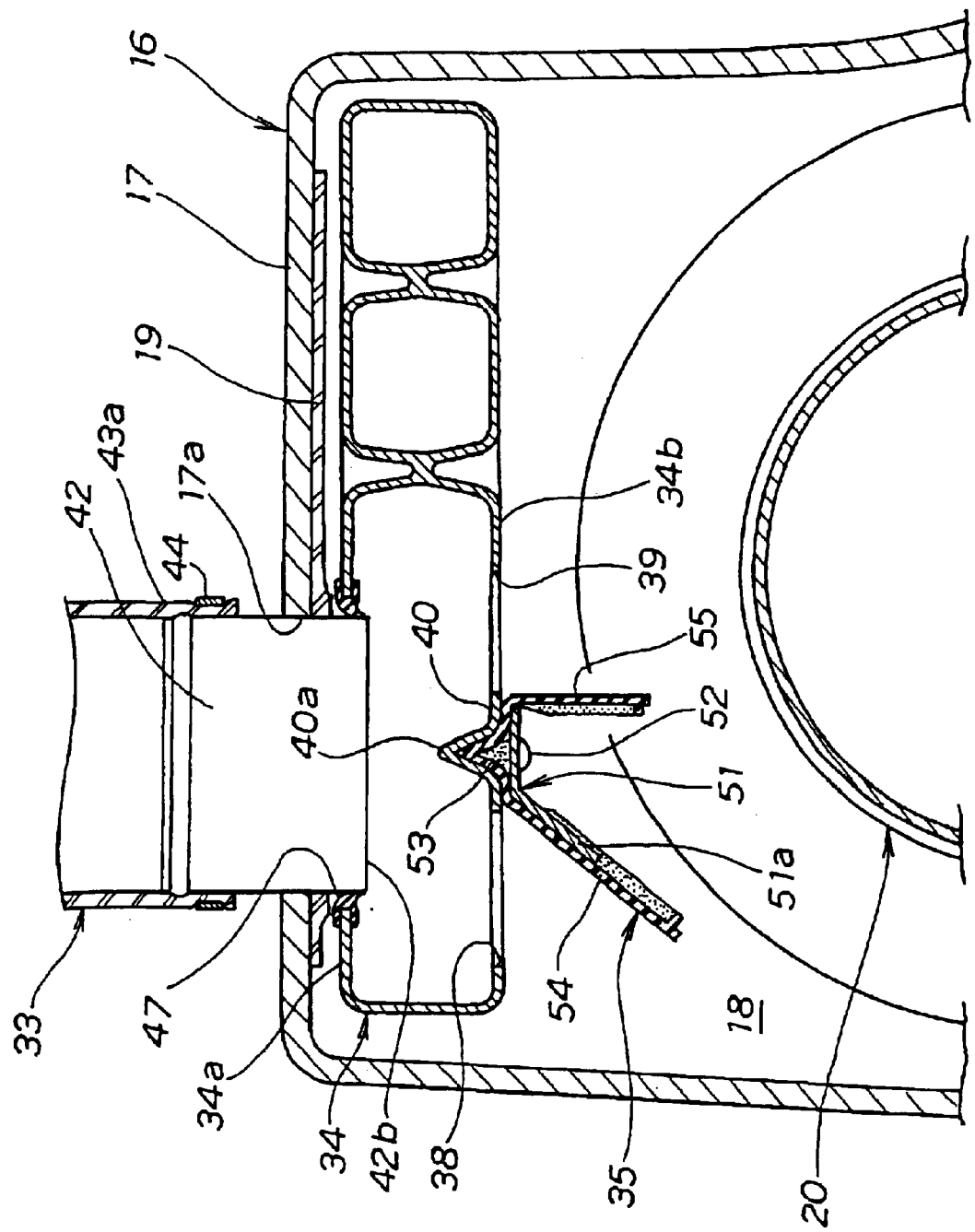
FIG. 4 is an enlarged view of an essential part of the exhaust system for a small watercraft according to the present invention.

FIG. 4 is an enlarged view of essential part of the exhaust system for a small watercraft according to the present invention and shows a state wherein a heat shield plate 19 is attached to a rear face of the ceiling wall 17 of the pump room 16 and the resonator 34 is provided on the back face side of the heat shield plate 19, and the outlet side pipe 42 is inserted in a mount hole 17a of the ceiling wall 17 of the pump room 16. A packing 47 is provided on an upper wall 34a of the resonator 34 and the outlet side pipe 42 is fitted in the packing 47 such that the outlet side pipe 42 is exposed to the inside of the resonator 34.

Further, FIG. 4 illustrates first and second openings 38 and 39 that are provided on a bottom wall 34b of the resonator 34 opposing to the outlet side pipe 42 and are exposed to an internal space 18 of the pump room 16. A support beam 40 is provided between the first and second openings 38 and 39 and is formed so as to have a substantially inverted V-shaped cross section such that a apex portion 40a thereof projects toward the outlet side pipe 42 while the on/off valve 35 is attached to the support beam 40.

The on/off valve 35 is configured such that a substantially inverted L-shaped bracket 51 is fastened to the support beam 40 by means of screws 52 . . . to sandwich a substantially central portion of a valve body 53 between the bracket 51 and the support beam 40.

The valve body 53 includes first and second flaps 54 and 55. The first flap 54 hangs downwardly with its weight but assumes an inclined state as it is supported by an inclined portion 51a of the bracket 51. Because of its weight, the second flap 55 hangs downwardly substantially vertically as seen in FIG. 4.

Consequently, the first and second openings 38 and 39 of the resonator 34 can be kept in an open state.

By providing the on/off valve 35 on the outlet 42b side of the outlet side pipe 42 (on the outlet side of the exhaust pipe 33) in this manner, the first and second openings 38 and 39 of the resonator 34 can be opened or closed with the on/off valve 35 to open or close the outlet 42b of the outlet side pipe 42.

Here, if the small watercraft 10 during operation should be reversed, then the first flap 54 moves to the bottom wall 34b of the resonator 34 with the weight of the first flap 54 itself to close the first opening 38 of the resonator 34. Simultaneously, the second flap 55 moves to the bottom wall 34b of the resonator 34 with the weight of the second flap 55 itself to close the second opening 39 of the resonator 34.

By closing the first and second openings 38 and 39 in this manner, admission of water into the exhaust pipe 33 can be prevented.

Figure 5:
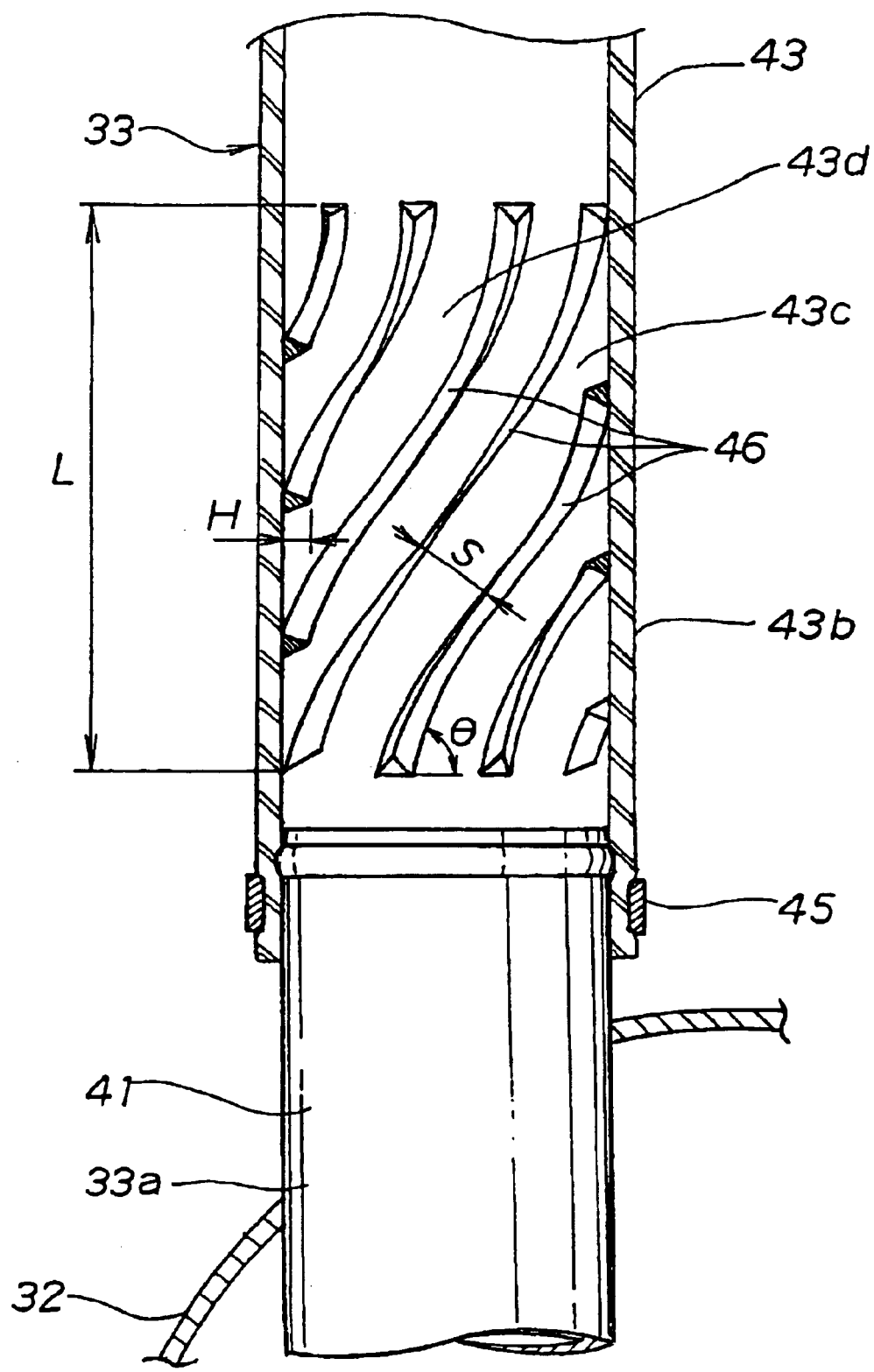
FIG. 5 is a sectional view showing baffle plates of the exhaust system for a small watercraft according to the present invention.

FIG. 5 is a sectional view showing baffle plates of the exhaust system for a small watercraft according to the present invention and showing a state wherein the spiral baffle plates 46 . . . for spirally introducing exhaust gas within a range L are provided at fixed intervals S with an angle of inclination θ on the inner face 43c of the front end 43b of the hose 43 (on the inner face of the U-shaped exhaust pipe 33).

Each of the baffle plates 46 . . . is formed such that it has a sectional shape like an isosceles triangle and the bottom side of the isosceles triangle is provided on the inner face 43c of the hose 43 such that the center thereof projects like an edge line so that the edge line has a height H.

It is to be noted that the cross sectional shape of the baffle plates 46 . . . is limited to this, but may be, for example, a rectangular shape.

Further, while a description is given above of the example wherein the baffle plates 46 . . . are provided within a range L on the inner face 43c of the front end 43b, the range L can be set arbitrarily. For example, it is possible to set the range L so as to be equal to the overall length of the hose 43.

Furthermore, also it is possible to integrally mold the baffle plates 46 . . . with the hose 43 when the hose 43 is molded, or it is also possible to adhere the baffle plates 46 . . . to the inner face 43c of the hose 43.

Since the spiral baffle plates 46 . . . are provided on the inner face 43c of the exhaust pipe 33, a flow of exhaust gas can be introduced spirally by the baffle plates 46 . . . . Consequently, centrifugal force acts upon cooling water having advanced into the exhaust pipe together with exhaust gas so that it is drawn up to the inner face 43c of the exhaust pipe 33.

Consequently, the cooling water can flow along the inner face 43c of the exhaust pipe 33 while the exhaust gas flows along a central portion 43d of the exhaust pipe 33, and therefore, the cooling water and the exhaust gas can be separated from each other.

As a result, exhaust gas in the exhaust pipe 33 can flow smoothly while a flow of the exhaust gas is not disturbed by cooling water.

Subsequently, an action of the exhaust system for a small watercraft is described with reference to FIGS. 6(a) and 6(b) and to FIGS. 7(a) and 7(b).

Figure 6A:
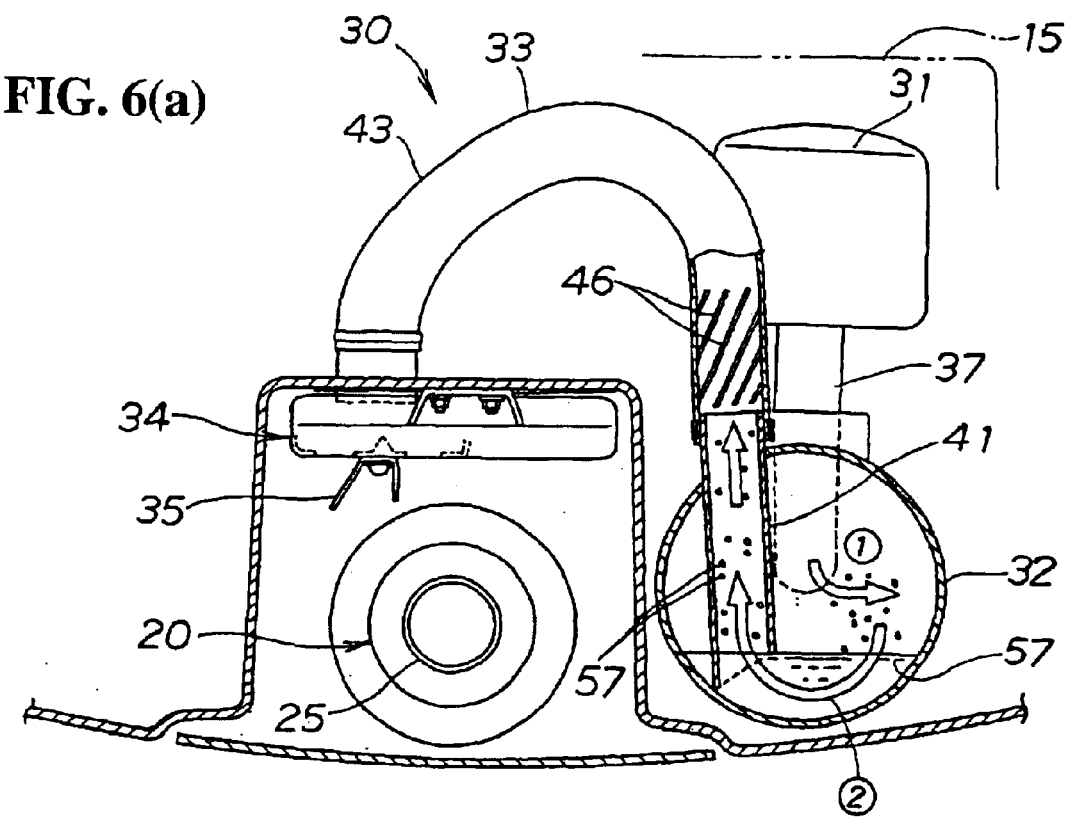
FIGS. 6(a) and 6(b) are schematic views illustrating a first action of the exhaust system for a small watercraft according to the present invention.

FIGS. 6(a) and (b) are views illustrating a first action of the exhaust system for a small watercraft according to the present invention.

Referring to FIG. 6(a), exhaust gas passes through the exhaust box 31 and the connecting pipe 37 and enters into the water muffler 32 as indicated by an arrow mark 1 inside a circle. Consequently, the entering exhaust gas is mixed with cooling water 57 in the water muffler 32.

The cooling water 57 and the exhaust gas mixed in the water muffler 32 enter into the inlet side; pipe 41 of the exhaust pipe 33 as indicated by an arrow mark 2 inside a circle.

Figure 6B:
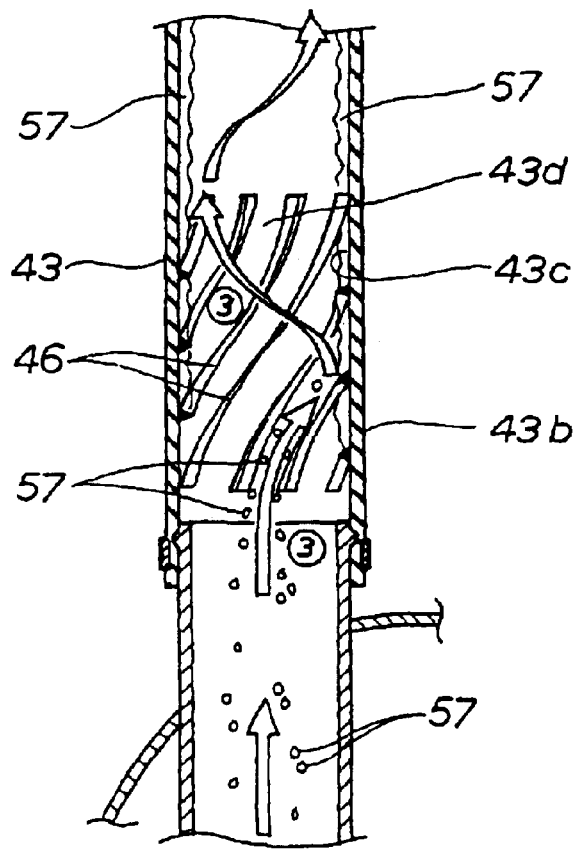

Referring to FIG. 6(b), the cooling water 57 and the exhaust gas having entered the inlet side pipe 41 enter into the hose 43. Since the spiral baffle plates 46 are provided on the inner face 43c of the front end 43b of the hose 43, the flow of the exhaust gas can be converted into a spiral flow as indicated by an arrow mark 3 inside a circle by the baffle plates 46 . . . .

Consequently, centrifugal force acts upon the cooling water 57 having entered into the exhaust pipe 33 together with the exhaust gas, and therefore, the cooling water 57 can be drawn up to the inner face 43c of the exhaust pipe 33.

Therefore, since the cooling water 57 can flow along the inner face 43c of the exhaust pipe 33 while the exhaust gas flows along the central portion 43d of the exhaust pipe 33, the cooling water 57 and the exhaust gas can be separated from each other.

Figure 7A:
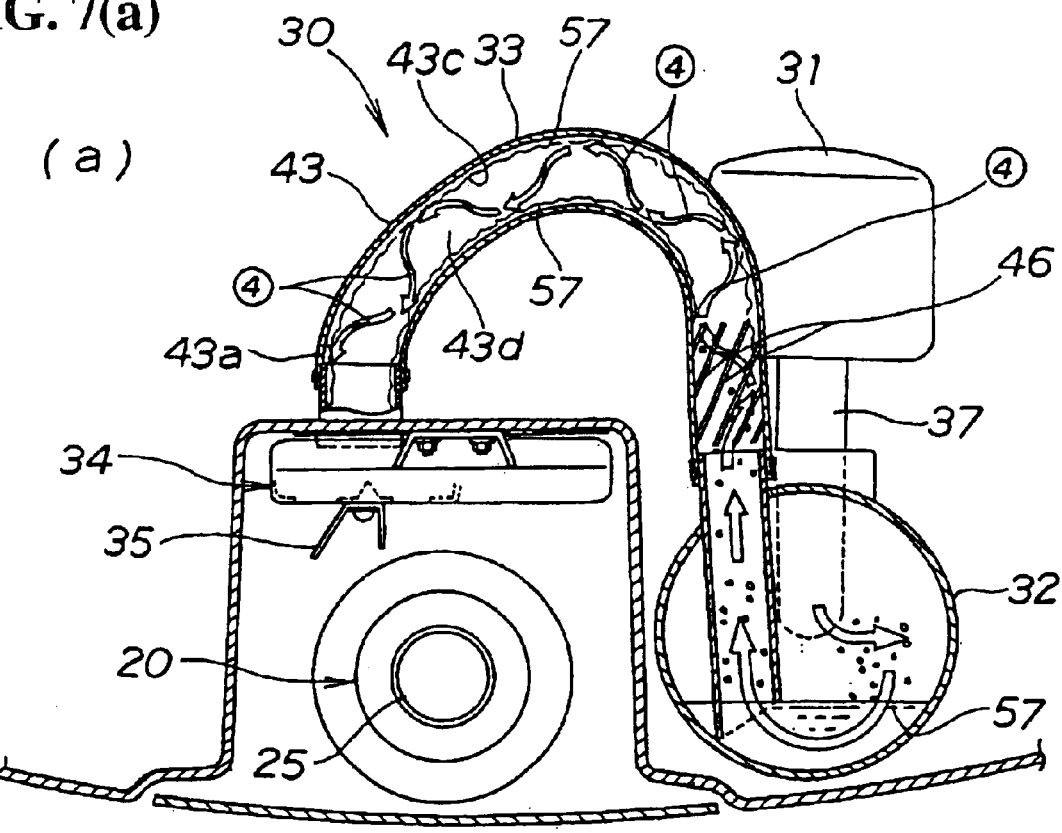
FIGS. 7(a) and 7(b) are schematic views illustrating a second action of the exhaust system for a small watercraft according to the present invention.
Figure 7B:
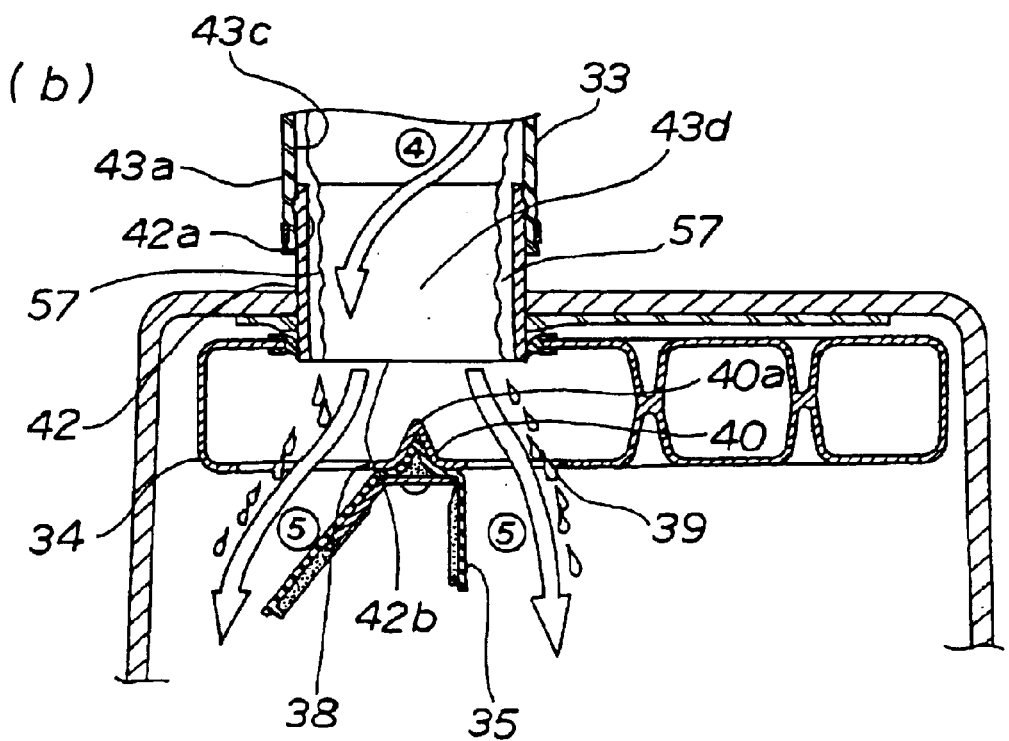
Figure 8:
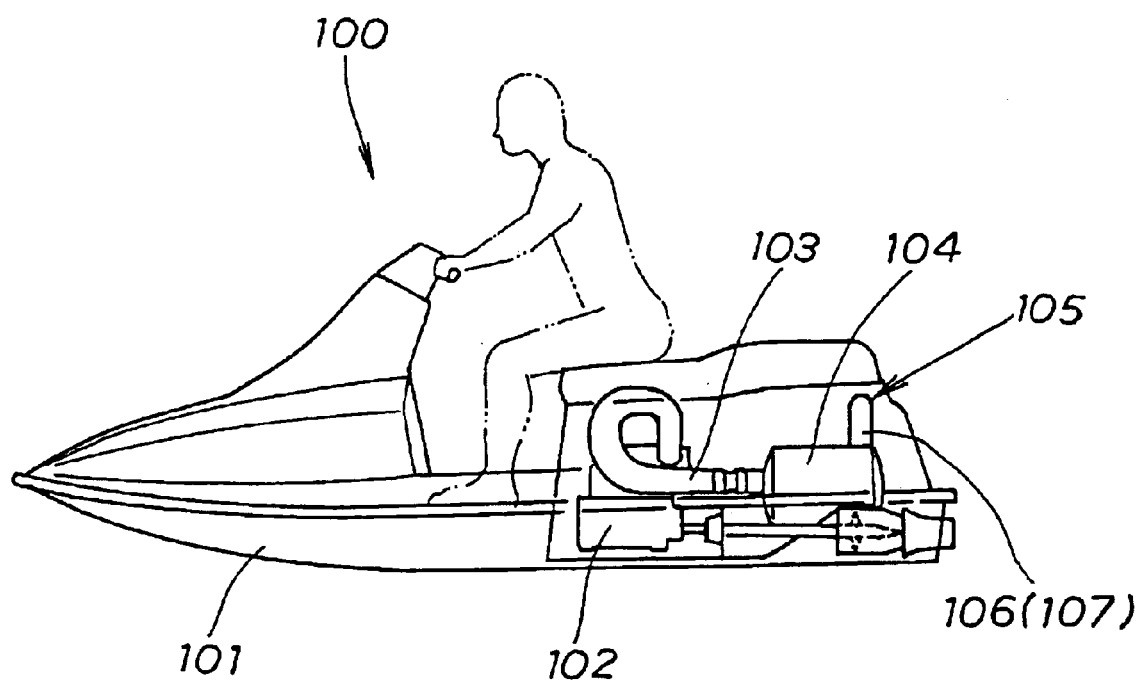
FIG. 8 is a side elevational view showing a conventional small watercraft.

FIGS. 7(a) and 7(b) are views illustrating a second action of the exhaust system for a small watercraft according to the present invention.

Referring to FIG. 7(a), exhaust gas having passed the spiral baffle plates 46 . . . flow spirally in the hose 43.

Consequently, the cooling water 57 flows along the inner face 43c of the exhaust pipe 33 up to the rear end 43a of the hose 43 while the exhaust gas flows along the central portion 43d of the hose 43 as indicated by an arrow mark 4 inside a circle, and therefore, the cooling water and the exhaust gas can be separated from each other.

Referring to FIG. 7(b), the exhaust gas having arrived at the rear end 43a of the hose 43 flows along the central portion 43d of the outlet side pipe 42 and flows from the outlet 42b of the outlet side pipe 42 through the first and second openings 38 and 39 of the resonator 34 to the outside as indicated by arrow marks 5 inside a circle.

Meanwhile, the cooling water 57 having reached the rear end 43a of the hose 43 flows along an inner face 42a of the outlet side pipe 42 and then flows from the outlet 42b of the outlet side pipe 42 through the first and second openings 38 and 39 of the resonator 34 to the outside as indicated by the arrow marks 5 inside a circle similarly to the exhaust gas.

Since the exhaust gas can flow in a state separated from the cooling water 57 in this manner, the exhaust gas in the exhaust pipe 33 can flow smoothly while the flow of the exhaust gas is not disturbed by the cooling water 57.

Furthermore, while the support beam 40 which supports the on/off valve 35 extends such that it crosses the outlet 42b of the outlet side pipe 42, since the support beam 40 is formed in a substantially inverted V-shape and the apex portion 40a thereof projects in a tapering manner into the resonator 34, the cooling water 57 and the exhaust gas can be discharged efficiently.

Further, since the cooling water 57 flows along the inner face of the exhaust pipe 33 (principally along the inner face 43c of the hose 43) and the exhaust gas flows along the central portion of the exhaust pipe 33 (principally along the central portion 43d of the hose 43) as shown in FIG. 7(a), the cooling water and the exhaust gas can be separated from each other. Consequently, even if the support beam 40 for the on/off valve 35 is provided on the outlet side of the exhaust pipe 33, it does not disturb the flow of the exhaust gas and allows the exhaust gas to flow smoothly.

It is to be noted that, while the embodiment described above is an example wherein the baffle plates 46 . . . are provided at the front end 43b of the hose 43 which forms the exhaust pipe 33, the location of the baffle plates 46 . . . is not limited to this, but the spiral baffle plates 46 . . . may otherwise be provided in the inlet side pipe 41 or the outlet side pipe 42 of the exhaust pipe 33.

Further, while description is given above of an example wherein the hose 43 is used for the exhaust pipe 33, a tube may be used in place of the hose 43.

Furthermore, while the embodiment described above is an example wherein the resonator 34 is provided on the outlet side end 33b of the exhaust pipe 33, the present invention is not limited to this, but may be applied to another exhaust system that does not include the resonator 34.

Further, while the embodiment described above is an example wherein the on/off valve 35 is provided for the resonator 34, the present invention is not limited to this but can be applied to another exhaust system which does not include the on/off valve 35.

The present invention exhibits the following effects due to the configuration described above.

According to the present invention, since the spiral baffle plates are provided on the inner face of the exhaust pipe, a flow of exhaust gas can be converted into a spiral flow by the baffle plates. Consequently, centrifugal force acts upon cooling water having entered into the exhaust pipe together with the exhaust gas so that the cooling water can be drawn up to the inner face of the exhaust pipe.

Consequently, since the cooling water can flow along the inner face of the exhaust pipe while the exhaust gas flows along a central portion of the exhaust pipe, the cooling water and the exhaust gas can be separated from each other. Accordingly, the exhaust gas in the exhaust pipe can flow smoothly while the flow of exhaust gas is not disturbed by the cooling water.

According to the present invention, the on/off valve is provided on the outlet side of the exhaust pipe such that the outlet of the exhaust pipe can be opened or closed with the on/off valve. Since the on/off valve is provided, admission of water into the exhaust pipe from the outlet side can be prevented.

In addition, since the cooling water and the exhaust gas can be separated from each other as the cooling water flows along the inner face of the exhaust pipe while the exhaust gas flows along a central portion of the exhaust pipe, even where a support member for the on/off valve is provided on the outlet side of the exhaust pipe, the exhaust gas can flow smoothly while the flow of the exhaust gas is not disturbed by the cooling water having struck against the support member.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust system for an engine of a small watercraft includes a water muffler and wherein an exhaust pipe connected to said water muffler extends upwardly once and then extends downwardly in such a manner as to have a substantially U-shape and exhaust gas and cooling water in said water muffler are discharged to the outside through said U-shaped exhaust pipe comprising:
    spiral baffle plates for spirally introducing exhaust gas being provided on an inner face of said U-shaped exhaust pipe.

2. The exhaust system for a small watercraft according to claim 1, wherein an on/off valve capable of opening and closing an outlet of said exhaust pipe is provided at the outlet of said exhaust pipe.

3. The exhaust system for a small watercraft according to claim 1, wherein the spiral baffle plates extend along the inner face of said U-shaped exhaust pipe for a predetermined interval.

4. The exhaust system for a small watercraft according to claim 3, wherein said spiral baffle plates are spaced apart by a predetermine interval and are inclined relative to a longitudinal axis by a predetermined angle.

5. The exhaust system for a small watercraft according to claim 1, wherein the baffle plates have a sectional shape in the form of an isosceles triangle.

6. The exhaust system for a small watercraft according to claim 1, and further including a resonator operatively connected to the exhaust pipe, said resonator including at least one discharge opening being disposed therein, an on/off valve being mounted relative to said at least one discharge opening for selectively closing said at least one discharge opening.

7. The exhaust system for a small watercraft according to claim 6, wherein said resonator includes two discharge openings and said on/off valve is operatively positioned adjacent to said two discharge openings for selectively closing said at least two discharge openings.

8. The exhaust system for a small watercraft according to claim 7, wherein said on/off valve includes a first flap having a predetermined weight and a second flap having a predetermined weight and wherein if the watercraft turns over the predetermined weight of the first and second flaps closes the first and second openings in said resonator.

9. The exhaust system for a small watercraft according to claim 1, wherein the spiral baffle plates are integrally molded on the inner face of the U-shaped exhaust pipe.

10. An exhaust system adapted to be used with an engine of a watercraft comprising:
    an exhaust pipe adapted to be connected to a water muffler, said exhaust pipe including an inner face;
    spiral baffle plates for spirally introducing exhaust gas, said spiral baffle plates being provided on said inner face of said exhaust pipe.

11. The exhaust system according to claim 10, wherein said exhaust pipe extends upwardly once and then extends downwardly in such a manner as to have a substantially U-shape and exhaust gas and cooling water in said water muffler are discharged to the outside through said U-shaped exhaust pipe.

12. The exhaust system according to claim 10, wherein an on/off valve capable of opening and closing an outlet of said exhaust pipe is provided at the outlet of said exhaust pipe.

13. The exhaust system according to claim 10, wherein the spiral baffle plates extend along the inner face of said U-shaped exhaust pipe for a predetermined interval.

14. The exhaust system according to claim 13, wherein said spiral baffle plates are spaced apart by a predetermine interval and are inclined relative to a longitudinal axis by a predetermined angle.

15. The exhaust system according to claim 10, wherein the baffle plates have a sectional shape in the form of an isosceles triangle.

16. The exhaust system according to claim 10, and further including a resonator operatively connected to the exhaust pipe, said resonator including at least one discharge opening being disposed therein, an on/off valve being mounted relative to said at least one discharge opening for selectively closing said at least one discharge opening.

17. The exhaust system according to claim 16, wherein said resonator includes two discharge openings and said on/off valve is operatively positioned adjacent to said two discharge openings for selectively closing said at least two discharge openings.

18. The exhaust system according to claim 17, wherein said on/off valve includes a first flap having a predetermined weight and a second flap having a predetermined weight and wherein if the exhaust system turns over the predetermined weight of the first and second flaps closes the first and second openings in said resonator.

19. The exhaust system according to claim 10, wherein the spiral baffle plates are integrally molded on the inner face of the U-shaped exhaust pipe.

* * * * *